United States Patent
Spitz

[11] Patent Number: 6,000,616
[45] Date of Patent: Dec. 14, 1999

[54] METHODS TO DETERMINE AND SELECTIVELY SAMPLE POSITIVE AND NEGATIVE PEAK VALUES OCCURRING WITHIN A SCAN REFLECTANCE PROFILE SIGNAL

[75] Inventor: Glenn Steven Spitz, Northport, N.Y.

[73] Assignee: Webscan, Inc., Brentwood, N.Y.

[21] Appl. No.: 08/854,873

[22] Filed: May 12, 1997

[51] Int. Cl.[6] .................................................. G06K 7/10
[52] U.S. Cl. ................................ 235/462.16; 235/462.25
[58] Field of Search ........................ 235/462.01, 462.19, 235/462.27, 462.25, 462.16

[56] References Cited

U.S. PATENT DOCUMENTS

| | | | |
|---|---|---|---|
| 4,000,397 | 12/1976 | Hebert et al. | 235/61.11 E |
| 4,219,152 | 8/1980 | Couch et al. | 235/463 |
| 4,517,455 | 5/1985 | Benitez, III et al. | 235/463 |
| 4,740,675 | 4/1988 | Brosnan et al. | 235/462 |
| 4,798,943 | 1/1989 | Cherry | 235/463 |
| 5,061,843 | 10/1991 | Sato et al. | 235/462 |
| 5,103,080 | 4/1992 | Barken | 235/437 |
| 5,140,146 | 8/1992 | Metlitsky et al. | 235/462 |
| 5,272,323 | 12/1993 | Martino | 235/462 |
| 5,294,783 | 3/1994 | Hammond, Jr. et al. | 235/462 |
| 5,463,211 | 10/1995 | Arends et al. | 235/462 |
| 5,484,994 | 1/1996 | Routstaei | 235/462 |
| 5,557,094 | 9/1996 | Barken | 235/462 |
| 5,633,488 | 5/1997 | Spitz | 235/462 |

OTHER PUBLICATIONS

American National Stndards Institute (ANSI), "Bar Code Print Quality Guideline", ANSI X3. 182—1990, Mar. 1990.
Uniform Code Council, "Quality Specification for the UPC Printed Symbol" [Not Submitted—Multiplicity of Above Item'AN'], Sep. 1994.

*Primary Examiner*—Donald Hajec
*Assistant Examiner*—Daniel Sherr
*Attorney, Agent, or Firm*—Island Patent Associates

[57] ABSTRACT

Methods and associated apparatus are provided to analyze and selectively sample scan reflectance profile (SRP) signals by producing corresponding first derivative and second derivative signals, as the SRP signal is generated. The methods employ the occurrences of zero crossings of the first and or second derivative signals, along with occurrences of the level of the first derivative signal rising above, or dropping below, predefined positive or negative threshold levels, respectively. Sample values, including positive and negative peak sample values, are produced and made available for post processing to determine one or more figures of merit (or quality parameters) that are indicative of the quality of a bar code indicia that was scanned to generate the SRP signal analyzed and processed.

30 Claims, 5 Drawing Sheets

METHODS TO DETERMINE AND SELECTIVELY SAMPLE POSITIVE AND NEGATIVE PEAK VALUES OCCURRING WITHIN A SCAN REFLECTANCE PROFILE SIGNAL

CROSS REFERENCE TO RELATED APPLICATIONS

The subject matter of the present application is related to that of U.S. Pat. No. 5,633,488, which issued on May 27, 1997, and is hereby incorporated by reference.

BACKGROUND OF THE INVENTION

1. Field of the Invention

The present invention relates generally to the evaluation of the quality of bar code indicia. More particularly, the invention relates to methods and apparatus to enable the high speed collection of critical values, and other critical values, occurring within scan reflectance profile signals generated by scanning indicia, such as bar code indicia.

2. Description of the Prior Art

The scanning of bar code indicia with devices such as laser scanners, and the like, typically results in the generation of a scan reflectance profile (SRP) signal. To enable the quantitative evaluation of the quality of the scanned indicia, very often known systems (fully) digitized the SRP signal. Such systems employ an analog-to-digital converter to produce a large sequence of sample values (i.e., data), that are stored or queued in a memory device for later processing. In applications where high speed evaluation is required, the above approach, which requires the consideration (i.e., processing) of the full set of sample values, presents a limiting factor. There is a need to provide improved 'higher speed' methods and apparatus to digitize and process the SRP signals generated to evaluate indicia quality.

At present, a number of industry standards or guidelines have been established to quantitatively evaluate the quality of bar code indicia. Two such guidelines have been defined by the American National Standards Institute (ANSI), and the Uniform Code Council (UCC). The ANSI guideline (ANSI X3.182-1990) is titled "Bar Code Print Quality Guideline". The UCC guideline is titled "Quality Specification for the UPC Printed Symbol" (September 1994). The ANSI and UCC documents are hereby incorporated by reference. In particular, the ANSI document provides in section 4 measurement methodologies and related information, while parts 2 and 3 of the UCC document provide definitions and related measurement subject matter. These two documents define a number of quality indicating 'figures of merit' that can be determined from the sampled scan reflectance profile signal. However, since each guideline defines an entire procedure for evaluation, and further requires a succession of scans be taken at equally spaced locations within an "interrogation window" along the height of the elements forming the bar code indicia, full compliance with these standards/guidelines has presented a significant challenge when the SRP signals must be processed in what may be termed "real-time", say as indicia are being printed on retail packages or products.

As disclosed in the cross-referenced and U.S. Pat. No. 5,633,488 to Spitz, a careful review of the ANSI specification, and other like (print) quality standards, reveals that many if not all important quality parameters (or figures of merit) may be determined by considering only the level of reflectance provided by the positive peaks and the negative peaks within the SRP signal. Accordingly, the "other" non-peak sample values are of little use when considering quality parameters such as symbol contrast, modulation, edge contrast, and the like. Therefore, when considering the above prior art systems, wherein a full set of sample values are collected and stored, a "filtering" process must be carried out to first isolate the positive and negative peak values present in the full set of sample values collected. As a result, a great deal of processing time and power is consumed before the actual evaluation parameters may be determined. Further, the processing demands on a system are exacerbated where compliance is required (or desired) to provide, say, full ANSI quality reporting.

It is also known in the art to employ circuitry to produce first and second derivative signals of the scan reflectance profile signal for various purposes. These signals, which are produced as the SRP signal is generated, are generally employed to detect edges, or element boundaries, occurring within the SRP signal. The technique was developed to provide an accurate indication of the location of the element edges (or transitions) within the SRP signal, even in the presence of ambient light, noise, and the like. Those skilled in the art will recognize that peaks in the level of the first derivative signal will indicate the respective inflection points (of the SRP signal) and the occurrence of an edge therein, as will certain zero crossings of the second derivative signal. The use of the first and second derivative signals (as well as related signals produced by inverting, adding, subtracting, etc., of the derivative and SRP signals) is provided by many U.S. patents, including U.S. Pat. No. 4,000,397 to Herbert et al., and U.S. Pat. No. 5,463,211 to Arends et al. Although these and other systems have employed the first and/or second derivative signals of the SRP signal, to determine edges and transitions within the SRP signals, they have not been employed to determine peaks occurring within the SRP signal to provide for the high speed analysis of said signals, and more broadly to support the high speed evaluation of indicia, including bar code indicia.

Objects of the present invention are, therefore, to provide new and improved methods and apparatus, incorporating the use of first and or second derivative signals to analyze and selectively sample (or selectively store samples of) one or more scan reflectance profile signals to capture critical values occurring therein, having one or more of the following capabilities, features, and/or characteristics:

- enable high speed analysis and evaluation scan reflectance profile signals as they are generated;
- process reflectance data samples as they (the samples) are generated in order to store in memory, or generally make available, only the critical (e.g., peak) sample values that are useful for various quantitative evaluations;
- utilizing the first and or second derivative signals to determine appropriate times to sample an SRP signal to determine (capture) the peak values, and possibly other critical values, and the corresponding level of reflectance associated with each sample determined;
- capture critical peak samples, along with associated and related data, which will, among other uses, support the recreation of an approximate graphical representation of one or more portions of the scan reflectance profile signal originally generated by scanning the indicia;
- enable the detection and quantification of indicia defects as indicia are being printed or otherwise disposed on products and packages;
- support real-time verification of indicia in demanding applications;

significantly reduce the amount of sample memory required to store sample values collected;

reduce the processing overhead (including processing time and CPU utilization) required to enable high speed ANSI level evaluation reporting; and relatively low cost implementations using many known components and devices, which are readily available.

SUMMARY OF THE INVENTION

In accordance with the invention, a method and apparatus to analyze and sample a scan reflectance profile signal to determine the level of all positive peaks and all negative peaks occurring therein. The method provides for producing a first derivative signal of the scan reflectance profile signal as the scan reflectance profile signal is generated, and determining when the level of the first derivative signal has risen above a predefined first threshold level, or when the level of the first derivative signal has dropped below a predefined second threshold level. A sample value is next produced, which is substantially representative of the level of the scan reflectance profile signal, at the occurrence of the first zero crossing of the first derivative signal following the occurrence of either of the rise above the first threshold level or the drop below the second threshold level. The sample value produced may then be stored (and or made immediately available to a post processing computer) and the method repeated for each portion of the scan reflectance profile signal to be analyzed and sampled. It should be noted that the occurrence of each zero crossing of the first derivative, either following the rise above or the drop below said threshold levels, respectively, is indicative of the occurrence of a peak within the scan reflectance profile signal that is to be captured, sampled, and stored. Each stored sample value may then be employed for possible post processing to determine at least one figure of merit to be assigned the scan reflectance profile signal analyzed (and an indicia scanned to provide said sample values).

Another aspect of the invention provides for the collecting of sample values of critical points of the scan reflectance profile signal and the level of the first derivative signal at zero crossings of the second derivative signal, if the level of the first derivative signal is above a third threshold level or below a forth threshold level. This information may be employed to support the non-causal determining of the occurrences of edges within the SRP signal. Further, it is contemplated that one or more positive peak detector units and one or more negative peak detector units may be included to collect the positive peak values and negative peak values, respectively, at a point in time after said peak values actually occurred. As such, the positive and negative peak detection units are configured to "remember" the analog level of the peak value until reset by an appropriate reset operation.

For a better understanding of the present invention, together with other and further objects, features, and embodiments thereof, reference is made to the accompanying drawings and the associated detailed description, with the scope of the invention pointed out in the appended claims.

BRIEF DESCRIPTION OF THE DRAWINGS

In the drawings, like elements are assigned like reference numerals. The drawings are briefly described as follows.

DETAILED DESCRIPTION OF THE INVENTION

It is important to establish the definition of a number of terms that will be used throughout this disclosure. The terms "collect" or "collecting", as applied to determining the level of signals including a scan reflectance profile (SRP) signal, a first derivative signal, or other related signal levels, will be defined as the determining of the analog level of said signal, possibly ascertained by employing devices such as peak level detecting (determining) analog or digital circuits, sample/hold circuits, analog-to-digital converters, and the like. Similarly, the expression "producing a sample" may be assumed to be an equivalent operation, as would the terms "sampling" and "sampled". Accordingly, one sample value is generally produced for each signal level that is captured, collected, and or determined, wherein the level of the signal may be ascertained at substantially the same time said level occurs, or at a point in time after the desired level has occurred. It is also important to understand that the expressions "a portion" or "each portion", as utilized within this disclosure when referring to a scan reflectance profile (SRP) signal, may generally be assumed to refer to a section of the SRP signal corresponding to one or more scanned elements. It must further be understood that the term 'zero crossing', which is well known to skilled artisans, may be defined to occur at a level slightly above or slightly below the actual zero-reference (ground) crossing point or level. Accordingly, the detected zero crossing location may be offset slightly from the true zero crossing level. Other meanings and terms will be provided as required, and defined in the context in which they are applied.

Figure 1A:
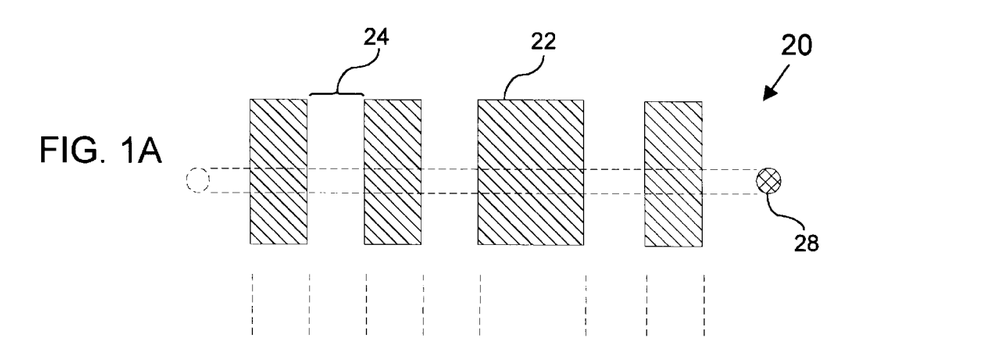
FIG. 1A illustrates the scanning of several elements forming an indicia such as a bar code indicia.

Referring now to FIG. 1A, there is illustrated a portion of an ideal bar code indicia 20 comprised of a number of bar elements 22, and space elements 24 disposed therebetween. The bar elements 22 and the space elements 24, which are often generically termed "elements", depict a portion of the information carrying and decodable elements of the bar code indicia 20. By scanning the elements (including the bars 22 and the spaces 24) of the bar code indicia 20, possibly using a laser scanner unit, a scan reflectance profile signal is generated.

Figure 1B:
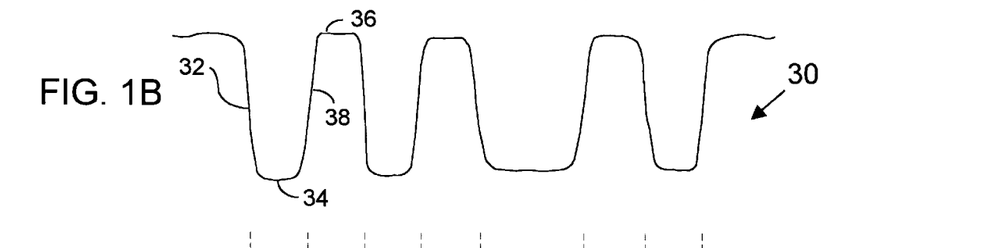
FIGS. 1B, 1C, and 1D depict (in a synchronous fashion) somewhat idealized SRP, first derivative, and second derivative waveforms, respectively, which may be produced or generated by the laser scanning of the plurality of elements depicted in FIG. 1A.
Figure 1C:
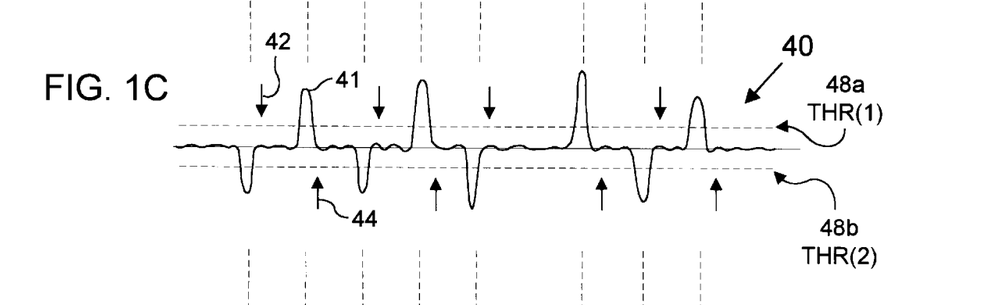

Scanning devices, such as optical laser scanners and the like, are well known in the art. A typical scanner unit sweeps a laser spot 28 at nearly constant velocity across the bar code indicia 20, from left to right as shown in FIG. 1A, and produces in real-time the scan reflectance profile (SRP) signal, as depicted in FIG. 1B. Those skilled in the art will understand that a first derivative signal, as well as a second derivative signal, may be produced by employing analog differentiator circuits comprised of resistors, capacitors, amplifiers, etc. The first derivative signal 40 of the SRP signal 30 is provided in FIG. 1C. It can be seen that the edges of the SRP signal are indicated by narrow (possibly) rounded pulses, within the first derivative signal 40. In addition, a peak value occurring within the SRP signal 30 is characterized in the first derivative signal 40 by a number of possible sequences of events. When considering positive peaks, defined as having a peak level with respect to the adjacent portions of the SRP signal 30, for example peak 36, it can be seen that the first derivative signal 40 initially rises from a level lingering near zero to a level above a first threshold level, for example threshold level THR(1), as shown in FIG. 1C. At the inflection point 38 of the SRP signal 30, the first derivative signal 40 reaches a peak level 41. As the SRP signal 30 approaches and reaches peak 36, the first derivative signal 40 returns (drops) back to and (eventually) crosses the horizontal axis. That is, as the SRP signal 30 reaches the peak 36, the first derivative indicates the occurrence of the peak 36 by dropping to (or near) zero, thereby providing a negative going zero crossing. Accordingly, if the level of the scan reflectance profile signal is captured at the point in time said negative going zero crossing occurs, the level of the positive peak 36 may be determined. The negative going zero crossing may result in a peak being captured (and sampled) at 44, as shown in FIG. 1C.

In a similar fashion to the above method, negative peaks (such as negative peak 34 of FIG. 1B) within the SRP signal may be collected by determining when the level of the first derivative signal 40 drops below (e.g., becomes more negative than) a second threshold level, say THR(2), and subsequently returns to zero and provides a positive going zero crossing. The positive going zero crossing may result in the negative peak 34 being captured and determined at 42, as shown in FIG. 1C. Accordingly, a change in the level of the first derivative signal 40, wherein the level rises above or drops below predefined threshold levels, followed by the subsequent occurrence of a zero crossing event of the first derivative signal 40, indicates the occurrence of a peak value (either a positive peak value or a negative peak value) which may be captured, sampled and stored for later use in determining one or more quality indicating figures of merit, for example, as established by the ANSI standard or UCC guideline. Alternate phraseology that may be employed when capturing, sampling, and storing the level of a signal is to say the level is "determined" or "collected". It should be noted that the THR(1) provides immunity to a moderate level of system noise, such that only true or significant peaks are detected and collected. Here the term 'significant' indicates those peaks due to the actual characteristics of the SRP signal (possibly including peaks caused by spots and or voids), and not system noise.

Figure 1D:
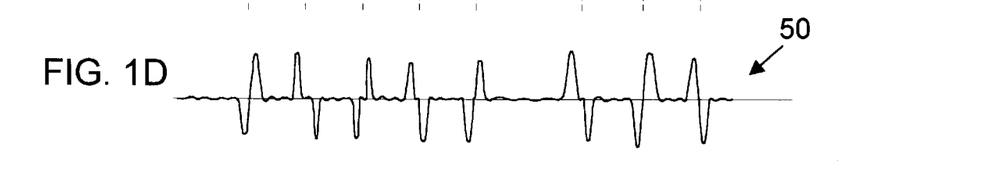

Provided along with the SRP signal 30 of FIG. 1B, and the first derivative signal 40 of FIG. 1C, is a second derivative signal 50, as depicted in FIG. 1D. It can be seen in FIGS. 1C and 1D that each peak of the first derivative signal, for example positive peak 41, results in a corresponding occurrence of a zero crossing of the second derivative signal 50. Therefore, the occurrence of a peak in the first derivative signal 40, may be detected via the occurrence of an associated zero crossing of the second derivative signal 50. As will be addressed below, a number of methods and apparatus may be employed to determine critical, possibly peak values, that occur within a scan reflectance profile (SRP) signal, the first derivative signal of the SRP signal, and or the second derivative signal of the SRP signal. It may further be noted that the SRP signal 30, its first derivative signal 40, and its second derivative signal 50, as provided in FIG. 1B, FIG. 1C, and FIG. 1D, respectively, are depicted in a somewhat approximated and idealized form, and are intended to be illustrative only.

Figure 2A:
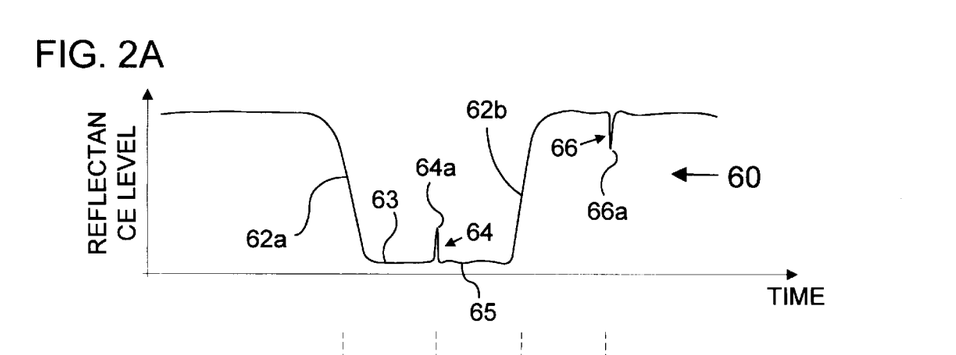
FIGS. 2A, 2B, and 2C illustrate an enlarged view of a portion of an SRP signal, along with a corresponding first derivative signal and a second derivative signal.
Figure 2B:
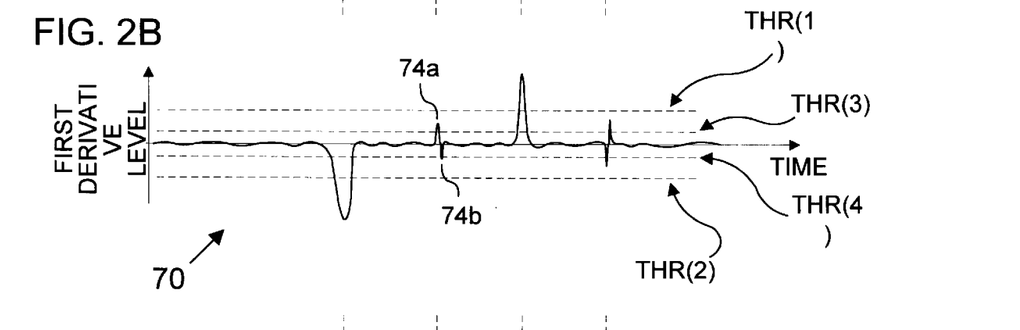
Figure 2C:
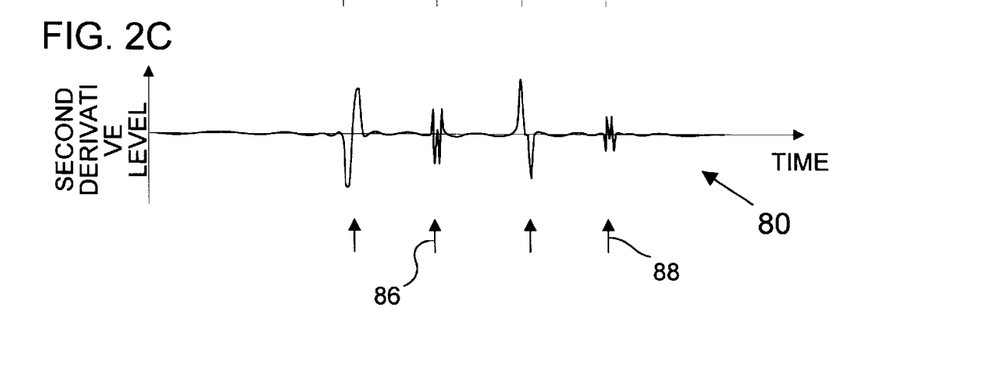

Turning now to FIG. 2A, there is illustrated an enlarged and emphasized portion of an SRP signal 60 (and related signals). The SRP signal 60 is illustrated having therein defects including a positive peak or spike 64 providing a positive peak value 64a (caused typically by scanning a void in a bar element), and a negative spike 66 providing a negative peak value 66a (often caused by the presence of a spot in a space element). It is a contemplated function of the present invention to provide a means and methods to support the detecting, capturing, and (subsequent) quantifying of such defects. A first derivative signal 70 as shown in FIG. 2B, and a second derivative signal 80 as shown in FIG. 2C, may be produced as the scan reflectance profile signal 60 is generated. Such derivative signals (i.e., 70 and 80) may be utilized to indicate the points in time at which edges may be assumed to occur. For example, consider an approach wherein if zero crossings of the second derivative signal 80 are accompanied by the level of the first derivative being above a third threshold level, say THR(3), or below a forth threshold level, say THR(4), the level of the SRP signal 60 and the level of the first derivative signal 70 are captured, sampled and stored. Note that the method using the level of the first derivative signal along with the zero crossings of the second derivative to determine when true edges occurred in an SRP signal was first introduced in U.S. Pat. No. 4,000, 397 to Hebert et al., which is hereby incorporated by reference. However, the use of this method, and possibly others known to skilled individuals, may be applied to collecting and grouping peak sample values captured and stored to enable the quality of bar code indicia to be quantitatively evaluated.

As is known in the art, when evaluating the quality of an indicia, such as a bar code indicia, it is important to be able to causally or non-causally "group" the positive and or negative peaks associated with each scanned element composing the indicia. As such, it is helpful to distinguish which "pulses" of the first derivative signal 70 are caused by "true" edges of the SRP signal 60, for example, true edges 62a and 62b, and which pulses are caused by defects, for example, defect spikes 64 and 66. The use of threshold levels, such as first threshold level THR(1) and second threshold level THR(2), may be employed to determine if the level of the first derivative signal 70 is above or below said respective thresholds, and therefore, may be assumed to be associated with the occurrence of a true edge. Further, a third threshold level THR(3) and a forth threshold level THR(4), as illustrated in FIG. 2B, may further be employed to indicate if the level of a pulse (such as pulse 74a or 74b), is relatively small (i.e., less than THR(1), and greater than THR(2)), and as such may be assumed to be associated with defects and not true edges.

In practice, a skilled individual may choose to determine (sample and store) the level of the SRP signal 60, as well as the level of the first derivative signal 70, with each occurrence of a zero crossing event of the second derivative signal 80 which is accompanied by the level of the first derivative signal 70 being above the third threshold level THR(3), or below the forth threshold level THR(4). At a subsequent time, the sample values collected, due to second derivative crossings, may be processed and analyzed to apply the first threshold level THR(1) and the second threshold level THR(2) to distinguish true edges from defects. This would support the "grouping" of the peak sample values collected, to associate at least one peak sample value collected for each respective element of a bar code indicia scanned to generated the scan reflectance profile signal analyzed.

Figure 3:
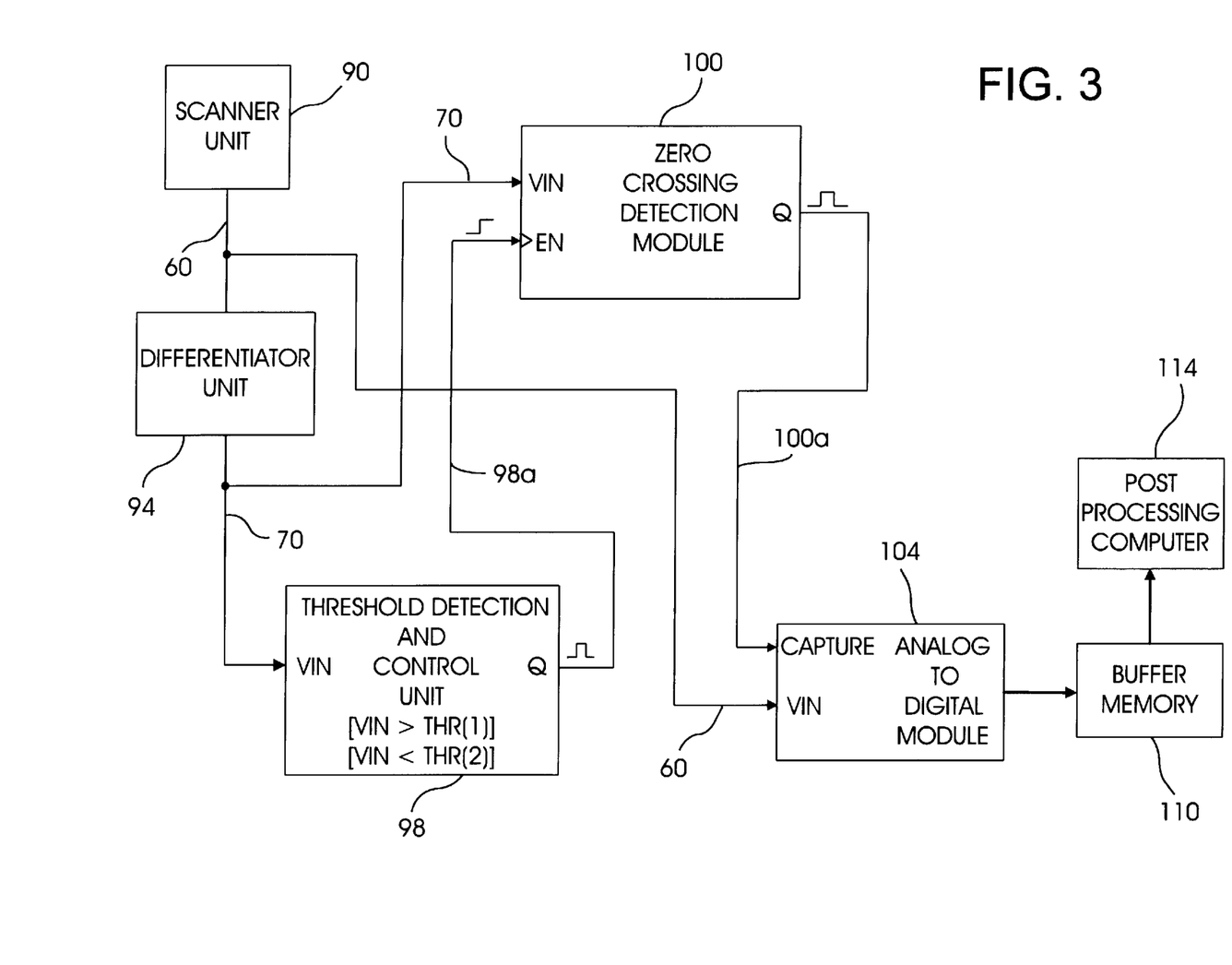
FIG. 3 illustrates a high level block diagram of a first simplified embodiment of the invention.
Figure 4:
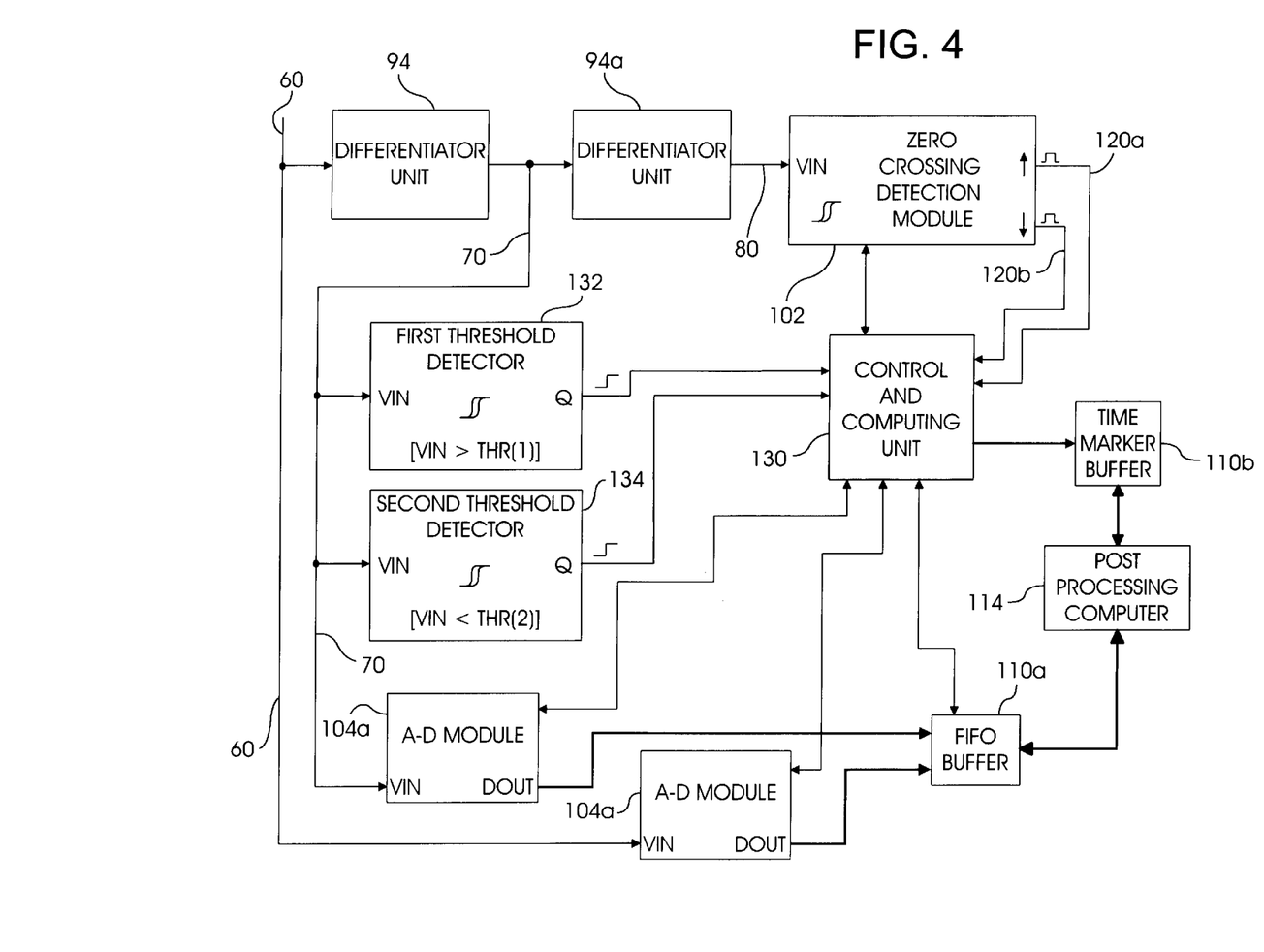
FIG. 4 is a functional block diagram of another embodiment of the invention.
Figure 5:
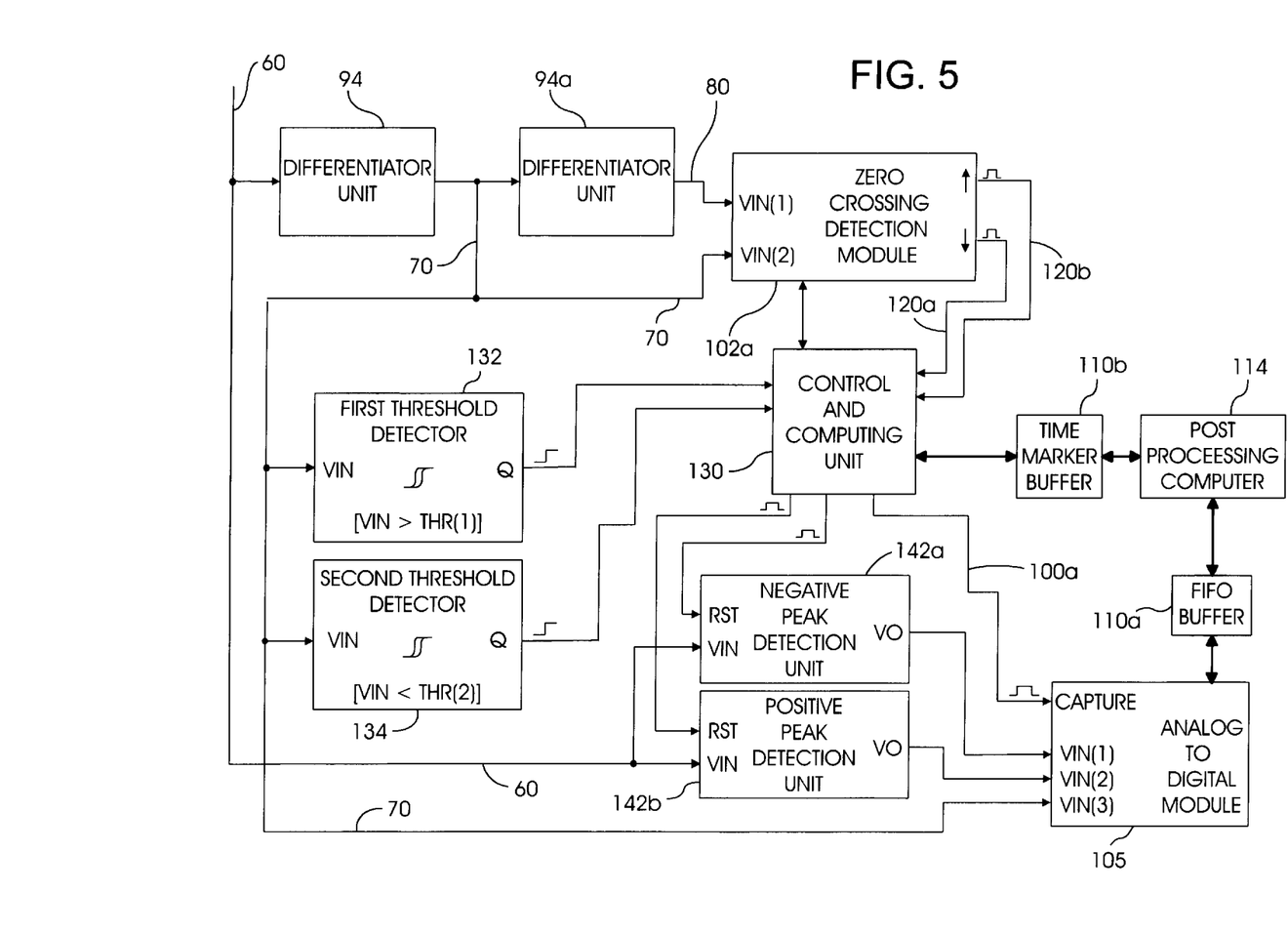
FIG. 5 is provides a block diagram of an embodiment in accordance with the present invention which explicitly includes a positive peak detection unit and a negative peak detection unit.

Various methods that utilize a first derivative signal (of an SRP signal 60), and possibly a second derivative signal, to collect peak values occurring within the SRP signal, will now be disclosed while referring to FIGS. 3, 4 and 5. Yet other methods may be provided by skilled persons upon a careful reading and review of this disclosure. Turning first to FIG. 3, there is provided a high level block diagram of a conceptually simplified embodiment of the present invention. The embodiment of FIG. 3 is arranged to collect positive peaks and negative peaks occurring within an SRP signal 60 generated by a scanner unit 90. A differentiator unit 94 is provided to produce and possibly scale (the level of) and or condition the first derivative signal 70. The first derivative signal 70 is coupled to VIN of a zero crossing detection module 100 and to VIN of the threshold detection and control unit 98. The zero crossing detection module 100, which is responsive to a control signal 98a provided from the Q output of the threshold detection and control unit 98, is configured to sense the level (i.e., signal amplitude) of the first derivative signal 70. If the threshold detection and control unit 98 detects that the level of the first derivative signal has risen above a predefined first threshold level THR(1), or the level of the first derivative signal has dropped below a predefined second threshold level THR(2), the Q output may be pulsed and the zero crossing detection module 100 is "enabled". When enabled the zero crossing detection module 100 will determine when a (positive going or negative going) zero crossing event occurs on its VIN input, which results in a capture signal 100a (which may be provided as a short pulse) being provided to an analog to digital module 104. The analog to digital module 104 produces a sample value representative of the level of the SRP signal 60, which may be stored in a buffer memory 110. The sample value produced will substantially represent the level of a peak value, either a positive peak value or a negative peak, that occurred in the SRP signal (as indicated by the zero crossing event of the first derivative signal. In summary, with a sufficient rise or drop of the level of the first derivative signal 70, as determined by the threshold detection and control unit 98, the zero crossing detection module 100 is "enabled" viaenable signal 98a to detect an occurrence of a (possibly first) zero crossing of the first derivative signal 70. The detected occurrence of the zero crossing event, as understood by skilled individuals, indicates the presence of a peak in the SRP signal 60, which is captured, sampled and stored (i.e., collected or determined) by the analog to digital module 104 and subsequently made available, possibly via the buffer memory 110, to the post processing computer 114. The process would repeat until all portions of the SRP signal have been analyzed. The peak sample values, as well as other stored information, are made available for possible post processing to determine at least one figure of merit associated with the scan reflectance profile signal 60 (and the indicia scanned to generate said SRP signal). It should be understood that the system of FIG. 3 is depicted in a generic and simplified form. For example, as skilled individuals will recognize, various additional signals (to support initialization and other required functional activities) would be required for the proper operation of the embodiment of FIG. 3. As such, the system depicted is intended to be illustrative only and is provided to aid in disclosing and understanding the various aspects of the methods and means of the present invention.

Turning now to FIG. 4, there is provided another embodiment of the present invention. The functions of the scanner unit 90, and the differentiator unit 94 may be assumed to be equivalent to those provided with the FIG. 3 embodiment. A first threshold detector 132 and a second threshold detector 134 are included to determine, respectively, when the level of the first derivative signal 60 has risen above a predefined positive threshold level, for example THR(1), or when the level of the first derivative signal has dropped below a predefined negative threshold level, for example THR(2). The Q outputs of the first threshold detector 132 and the second threshold detector 134 may be suitably coupled to and sensed by a control and computing unit 130. It should be understood that a plurality of predefined threshold levels, including THR(1), THR(2), THR(3) and THR (4), as depicted in FIG. 2B, may be provided to determine the relative level of portions of the first derivative signal of FIGS. 1C, 2B, 3, 4, and 5. Further, it is contemplated that upon analyzing and processing an SRP signal, the threshold levels associated with various threshold detection circuits, such as the threshold detection and control unit 98, or the first threshold detector 132, may be altered to compensate for noise, ambient light levels, and the like. The employed threshold levels may also be altered to increase or decrease the sensitivity of the various embodiments of the invention to defect spikes (peaks) such as 64 and 66 of FIG. 2A.

Returning to FIG. 4, a second differentiator unit 94a, is included to produce the second derivative signal 80 of the SRP signal 60. The level of the second derivative signal is sensed by (i.e., coupled to) the zero crossing detection module 102 to detect and indicate the occurrences of each zero crossing of the second derivative signal. As depicted, the zero crossing detection module 102 may be configured with two outputs: one to indicate the occurrence of positive going zero crossings (via signal 120a) and a second to indicate the occurrences of negative going zero crossings (via signal 120b). Alternately, a single "indication signal" (not shown) may be provided to the control and computing unit 130. A plurality of a–d modules 104a, which may be similar in construction and function to the analog to digital module 104 of FIG. 3, are configured to produce a sample value indicating the level of the scan reflectance profile signal 60 and a sample value indicating the level of the first derivative signal 70 with the detection of each zero crossing of the second derivative signal if and when the level of the first derivative signal is either above the predefined (first) positive threshold level THR(1) or below the predefined (second) negative threshold level THR(2). Each sample produced by either of the a–d modules 104a, may be stored in a buffer memory unit, such as FIFO buffer 110a, or provided directly to the post processing computer 114. It must also be noted that the a–d module 104a may be arranged to constantly produce a succession of sample values, say, in an asynchronous mode of operation, wherein only 'critical values' (e.g. peaks) are stored and collected.

Those skilled in the art will recognize that the method of operation, as provided with reference to FIG. 3, may be supported by the embodiment of FIG. 4. In addition, skilled individuals will recognize that modifications are possible to the architecture of the embodiment of FIG. 4. For example, the zero crossing detection module 102 may be provided as two separate "analog" comparison circuits, or alternately, may be provided by a DSP processing element. The latter arrangement employing a DSP processor (and required support circuitry) may actually combine portions of one or more functional blocks provided in FIG. 4 into one or more elements provided by known DSP and/or microcontroller based embodiments. In a preferred embodiment, it is contemplated that the control/computing functions of the control and computing unit 130 may be provided by complex programmable logic devices (PLDs).

Turning now to FIG. 5 there is provided yet another embodiment of the present invention. A distinguishing feature shown is a zero crossing detection module 102a, which may be arranged to detect zero crossings of the first and second derivative signals, 70 and 80, respectively. Another distinguishing feature of this embodiment is the explicit provision of a negative peak detection unit 142a and a positive peak detection unit 142b, wherein each unit is configured to detect (and hold/store) an analog signal level. Accordingly, the negative peak detection unit 142a can capture and maintain the level of a negative peak (such as negative peak 66a of FIG. 2A), which is being sensed or received by way of the VIN input, even after the level of the signal has begun to increase. Similarly, the positive peak detection unit 142b can capture and "remember" the level of a positive peak (such as positive peak 64a of FIG. 2A) occurring within the SRP signal 60. It must be understood that the functions provided by the explicitly shown positive and negative peak detection units, 142a and 142b, are contemplated to possibly be provided by the a–d modules 104a, of FIG. 4. The advantages and functional benefits of the inclusion of such (peak detection) circuitry, in one or both the a–d modules 104a, will be apparent to those skilled in the art. Once the level of a negative peak or a positive peak value has been captured, it may coupled to (and sensed by) the analog to digital module 105, as illustrated. A capture signal 100a may then be issued to the analog to digital module 105 to produce a sample value representative of the (peak) level detected and captured. Those skilled in the art will appreciate the available means that may be employed to provide the negative peak detection unit 142a, the positive peak detection unit 142b, and the analog to digital module 105. Typically, peak detection unit embodiments are comprised of circuitry including resistors, capacitors, amplifiers, and the like. Analog to digital modules, such as 105, typically include devices such as A/D converters, voltage references, analog and digital multiplexers, control and gating devices, and the like. In addition, the plurality of a–d modules 104a of FIG. 4 may be considered equivalent to a single a–d conversion module, such as the analog to digital module 105 of FIG. 5. Accordingly, a combination of converter units may be employed by skilled persons to replace the function provided by analog to digital module 105.

The embodiment of FIG. 5 may be employed, with or without modification, to (generally) support the methods of operation disclosed above. In addition, an alternate method of operation contemplated for use with the embodiment of FIG. 5. This method provides for initially detecting a zero crossing in the first derivative signal 70, which is sensed by a zero crossing detection module 102a. Next, when the level of the first derivative signal 70 has risen above a predefined first threshold level, such as threshold level THR(1) or THR(3), or when the level of the first derivative signal has dropped below a predefined second threshold level, say THR(2) or THR(4), one of the following actions occurs. If the level of the first derivative signal 70 rises above the first threshold level, the positive peak detection unit 142b may be reset by an appropriate reset operation (possibly initiated by the control and computing unit 130) to enable the next occurrence of a positive peak to be captured, and the negative peak value (level) captured by the negative peak detection unit 142a may be sampled by the analog to digital module 105 (via the VIN(1) input). The sample value produced may then be stored in the FIFO buffer 110a, and or provided to the post processing computer 114. Should the level of the first derivative signal drop below the second threshold level, the negative peak detection unit 142a may be reset by an appropriate reset operation, and the positive peak value (level) captured by the positive peak detection unit 142b may be sampled (via the analog to digital module 105) to produce a sample value representative thereof. Again, the sample value produced may be stored in the FIFO buffer 110a and or provided to the post processing computer 114 for post processing. The above process would then be repeated until all portions (i.e., all elements) of the scan reflectance signal are analyzed, and all peaks values occurring therein have been determined and stored as peak sample values.

It is further contemplated that for each sample value produced, it may be desired to associate therewith a time marker value indicating the relative temporal position within the scan reflectance profile signal of the occurrence of each respective sample, including samples representative of the level of the SRP signal, the first derivative, or other stored levels which are utilized or determined by the analysis of the SRP (and related) signals. The time marker values may be provided by the control and computing unit 130, as shown in FIGS. 4 and 5, and possibly buffered by the time marker buffer memory 110b. One use which is contemplated for the collected time marker values is to recreate an approximate graphical representation of at least one portion of the scan reflectance profile signal that has been analyzed. Other uses of the time marker values are contemplated, and yet others may be supplied by skilled individuals.

Yet another operational embodiment of the present invention may be supported by the arrangement depicted in FIG. 5. The method includes producing a first derivative signal and a second derivative signal of the scan reflectance signal as the scan reflectance profile signal is generated. An initial detection of a zero crossing in the first derivative signal may be employed, as required to reset and or initialize the embodiment of FIG. 5. Next, when the level of the first derivative signal 70 has risen above a predefined first threshold level, say THR(1), a reset operation may be performed on the positive peak detection unit 142b, or when the level of the first derivative signal 70 has dropped below a predefined second threshold level, say THR(2), a reset operation may be performed on the negative peak detection unit 142a. At the detection of the next zero crossing of the second derivative signal 80 either a sample value is produced indicating the level of the negative peak captured by the negative peak detection unit 142a (following the occurrence of a rise above the first threshold level, as discussed above), or a sample value is produced indicating the level of the positive peak captured by the positive peak detection unit 142b (following the occurrence the drop below the second threshold level). Subsequently, the sample value produced may be stored in the FIFO buffer 110a, and or provided to the post processing computer 114. The process would then be repeated to continue analyzing the SRP signal until all portions have been analyzed and all peaks occurring therein have been determined and stored as peak sample values.

Referring generally to FIGS. 3, 4, and 5, a number of steps may be appended to the above preferred embodiments to provide for the grouping and processing of the sample values collected and made available to the post processing computer 114. The additional steps may include selecting the highest positive peak sample value and the lowest negative peak sample value collected by analyzing and processing the SRP signal, and determining the average value thereof. The average value may be utilized as a global threshold. The peak sample values are then processed in the sequence in which said sample values were collected to determine each incidence of a first sample that is above the global threshold, which is immediately followed by a second sample that is below the global threshold, or each incidence of a first sample that is below the global threshold, which is immediately followed by a second sample that is above the global threshold. Each occurrence of either incidence, which is assumed to indicate the occurrence of an edge within the scan reflectance profile signal, may next be utilized to group and associate at least one peak sample value collected with each respective element of the scanned bar code indicia. These steps may further include the "scanning" of each group of peaks values to determine the highest positive peak sample value and lowest negative peak sample value (occurring within each respective group), and the post processing said highest and lowest peak sample values to determine at least one figure of merit (or quality parameter) associated with the quality of the scanned bar code indicia.

While there have been described herein a plurality of the currently preferred embodiments of the present invention, along with varied methods of operation, those skilled in the art will recognize that other and further modifications may be made without departing from the invention and it is intended to claim all modifications and variations as fall within the scope of the invention and the appended claims.

What is claimed is:

1. A method to analyze and sample a scan reflectance profile signal to determine the level of all positive peaks and all negative peaks occurring therein, the method comprising the steps of:
   (a) producing a first derivative signal of the scan reflectance profile signal as the scan reflectance profile signal is generated;
   (b) determining one of:
      (i) when the level of the first derivative signal has risen above a predefined first threshold level, and
      (ii) when the Level of the first derivative signal has dropped below a predefined second threshold level;
   (c) producing a sample value representative of a peak level of the scan reflectance profile signal at the occurrence of a first zero crossing of the first derivative signal following the occurrence of one of step (b)(i) and step (b)(ii);
   (d) storing the sample value produced in step c; and
   (e) repeating steps b, c, and d until all portions of the scan reflectance profile signal have been analyzed;
   (f) the occurrence of each zero crossing of step (c) indicating the occurrence of a peak value within the scan reflectance profile signal, with the level of each peak value captured, sampled, and stored, being available for possible post processing to determine at least one figure of merit associated with the scan reflectance profile signal analyzed.

2. The method according to claim 1, further including the steps of:
   (a) producing a second derivative signal as the first derivative signal is produced;
   (b) producing a sample value indicating the level of the first derivative signal with the occurrence of each zero crossing of the second derivative signal when the level of the first derivative signal is one of:
      (i) above a predefined third threshold level, and
      (ii) below a predefined fourth threshold level; and
   (c) storing and making available the sample values produced in step (b) of claim 1 indicating the level of the first derivative signal.

3. The method according to claim 2, wherein the first threshold level is substantially equal to the third threshold level, and the second threshold level is substantially equal to the forth threshold level.

4. The method according to claim 2, including the additional steps of determining and storing a time marker value for each sample value collected, each time marker value indicating the relative temporal position within the scan reflectance profile signal of the occurrence of each respective sample value determined.

5. The method according to claim 4, further including the step of post-processing the sample values and the time marker values to recreate an approximate graphical representation of at least one portion of the scan reflectance profile signal.

6. The method according to claim 2, including additional steps required to process and group the sample values collected to evaluate the quality of an indicia which was scanned to generate the scan reflectance profile signal analyzed and sampled, the additional steps comprising:
   (a) selecting an overall highest positive peak sample value and an overall lowest negative peak sample value;
   (b) determining an average value of the peak sample values selected in step (a) to determine a global threshold;
   (c) processing the peak sample values determined in the sequence the sample values collected, the processing to determine each incidence of either of:
      (i) a first sample value that is above the global threshold, which is immediately followed by a second sample value that is below the global threshold, and
      (ii) a first sample value that is below the global threshold, which is immediately followed by a second sample value that is above the global threshold;
   (d) using each respective incidence of step (c) to indicate an occurrence of an edge within the scan reflectance profile signal to group and associate at least one peak sample value collected for each respective portion of the scan reflectance profile signal that corresponds to an element of the indicia scanned.

7. The method according to claim 6, further including the step of post processing the grouped peak values to determine at least one figure of merit associated with the quality of the scanned bar code indicia.

8. A method for analyzing and selectively sampling a scan reflectance profile signal generated as a bar code indicia composed of elements including bars and spaces is scanned, the scan reflectance profile signal being sensed by each of a positive peak detection unit and a negative peak detection unit, to determine the level of all positive peaks and all negative peaks occurring within each portion of the scan reflectance profile signal, the method comprising the steps of:
   (a) producing a first derivative signal of the scan reflectance profile signal;
   (b) determining one of:
      (i) when the level of the first derivative signal has risen above a predefined first threshold level and performing a reset operation on the negative peak detection unit, and
      (ii) when the level of the first derivative signal has dropped below a predefined second threshold level and performing a reset operation on the positive peak detection unit;

(c) doing one of:
  (i) producing a sample value indicating the level of a positive peak captured by the positive peak detection unit at the occurrence of a negative going zero crossing of the first derivative signal following the rise of the first derivative signal above the first threshold level, and
  (ii) producing a sample value indicating the level of a negative peak captured by the negative peak detection unit at the occurrence of a positive going zero crossing of the first derivative signal following the drop of the first derivative signal below the second threshold level;
(d) storing the sample value produced in step c; and
(e) repeating steps b, c, and d until all portions of the scan reflectance profile signal corresponding to the scanning of each bar and space have been analyzed;
(f) the occurrence of the negative going and positive going zero crossings, following a rise above the first threshold level or below the second threshold level, respectively, indicating an occurrence of a peak to be captured, sampled, and stored for possible post processing to determine at least one figure of merit associated with the quality of the scanned bar code indicia.

9. The method according to claim 8, wherein the occurrence of the zero crossing is the first zero crossing following one of the rise of the first derivative signal above the first threshold level or the drop of the first derivative signal below the second threshold level.

10. The method according to claim 9, further including the step of grouping sample values produced and stored for each element scanned, thereby enabling each group of peak sample values determined for each scanned element to be readily associated with the respective element.

11. The method according to claim 10, further including the step of post processing the each group of sample values to determine the highest positive peak sample value and lowest negative peak sample value occurring within each group of sample values.

12. The method according to claim 10, including the additional steps of determining and storing a time marker value for each sample value collected, each time marker value indicating the relative temporal position within the scan reflectance profile signal of the occurrence of each positive peak and each negative peak determined for each scanned element.

13. The method according to claim 12, further including the step of post-processing the stored sample values and the time marker values to recreate an approximate graphical representation of at least one portion of the scan reflectance profile signal.

14. The method according to claim 8, further including the steps of:
  (a) producing a second derivative signal as the first derivative signal is produced;
  (b) producing a sample value indicating the level of the first derivative signal with the detection of each zero crossing of the second derivative signal when the level of the first derivative signal is one of:
    (i) above a predefined third threshold level, and
    (ii) below a predefined fourth threshold level; and
  (c) storing and making available the sample values produced indicating the level of the first derivative signal.

15. The method according to claim 14, wherein the first threshold level is substantially equal to the third threshold level, and the second threshold level is substantially equal to the forth threshold level.

16. The method according to claim 14, further supporting the adjustability of the first, second, third, and forth threshold levels with each scan reflectance profile that is analyzed.

17. The method according to claim 14, further including the step of determining and storing a time marker value corresponding to the temporal position within the scan reflectance profile signal of each sample value produced indicating the level of the scan reflectance profile signal.

18. The method according to claim 17, including the additional steps required to post-process the sample values stored to evaluate the quality of the bar code indicia scanned to generate the scan reflectance profile signal analyzed and sampled, the additional steps comprising:
  (a) determining an overall highest positive peak sample value and an overall lowest negative peak sample value determined by analyzing the entire scan reflectance profile signal;
  (b) determining an average value of the highest positive peak sample value and the lowest negative peak sample value determined in step (a) to provide a global threshold level;
  (c) processing all peak sample values in the sequence collected, the processing including a determination of each incidence of either of:
    (i) a first sample value that is above the global threshold and is immediately followed by a second sample value that is below the global threshold, and
    (ii) a first sample value that is below the global threshold and is immediately followed by a second sample value that is above the global threshold; and
  (d) using each respective incidence of step (c), which is assumed to indicate an occurrence of an edge within the scan reflectance profile signal, to group and associate at least one peak sample value collected for each respective element of the indicia scanned.

19. The method according to claim 18, further including the step of post processing each respective group of sample values to determine a highest positive peak sample value and lowest negative peak sample value occurring therein.

20. The method according to claim 19, further including the step of post processing the highest positive and lowest negative peak sample values for each element to determine at least one figure of merit associated with the quality of the scanned bar code indicia.

21. The method according to claim 18, further including the step of post-processing the collected sample values and the associated time marker values to recreate an approximate graphical representation of at least one portion of the scan reflectance profile signal.

22. A method for analyzing and selectively sampling a scan reflectance profile signal generated by scanning a bar code indicia, the scan reflectance profile signal sensed, as it is generated, by each of a positive peak detection unit and a negative peak detection unit to determine the level of all positive peak values and all negative peak values occurring within each portion of the scan reflectance profile signal, the method comprising the steps of:
  (a) producing a first derivative signal of the scan reflectance signal as the scan reflectance profile signal is generated;
  (b) detecting a zero crossing in the first derivative signal;
  (c) determining, after the zero crossing detection of step (b), one of:
    (i) when the level of the first derivative signal has risen above a predefined first threshold level and performing a reset operation on the positive peak detection unit, and (ii) when the level of the first derivative signal has dropped below a predefined second threshold level and performing a reset operation on the negative peak detection unit;

(d) doing one of:
 (i) producing a sample value indicating the level of a negative peak captured by the negative peak detection unit at the occurrence of a rise above the first threshold level in step (c)(i), and
 (ii) producing a sample value indicating the level of a positive peak captured by the positive peak detection unit at the occurrence of the drop below the second threshold level in step (c)(ii);

(e) storing the sample value produced in step d; and (f) repeating steps b, c, d, and e until all portions of the scan reflectance profile signal are analyzed, and all peak values occurring therein have been determined and stored as peak sample values.

23. The method according to claim 22, further including the steps of:
(a) producing a second derivative signal as the first derivative signal is produced;
(b) producing a sample value indicating the level of the first derivative signal with the detection of each zero crossing of the second derivative signal when the level of the first derivative signal is one of:
 (i) above a predefined third threshold level, and
 (ii) below a predefined fourth threshold level; and
(c) storing and making available for post processing the sample values produced in step (b).

24. The method according to claim 23, wherein the first threshold level is substantially equal to the third threshold level, and the second threshold level is substantially equal to the forth threshold level.

25. The method according to claim 22, including the additional steps required to process the sample values stored to evaluate the quality of an indicia which was scanned to generate the scan reflectance profile signal analyzed and sampled, the additional steps comprising:
(a) selecting a highest positive peak sample value and a lowest negative peak sample value from the stored sample values;
(b) determining an average value of the highest positive peak sample value and the lowest negative peak sample value, the average value to be utilized as a global threshold;
(c) processing the peak sample values stored in the sequence in which the sample values were collected, the processing to determine each incidence of either of:
 (i) a first sample value that is above the global threshold, which is immediately followed by a second sample value that is below the global threshold;
 (ii) a first sample value that is below the global threshold, which is immediately followed by a second sample value that is above the global threshold;
(d) each incidence of step (c) indicating the occurrence of an edge within the scan reflectance profile signal which may be employed to group and associate at least one peak value collected for each element of the indicia scanned to generated the scan reflectance profile signal; and
(e) using each respective incidence of step (d), which is assumed to indicate the occurrence of an edge within the scan reflectance profile signal, to group and associate at least one peak sample value collected for each respective portion of the scan reflectance profile signal that represents an element of the scanned indicia.

26. The method according to claim 25, further including the step of a post processing the groups of peaks sample values to determine at least one figure of merit associated with the quality of the scanned bar code indicia.

27. A method for analyzing and selectively sampling a scan reflectance profile signal generated as a bar code indicia composed of elements including bars and spaces is scanned, the scan reflectance profile signal sensed by each of a positive peak detection unit and a negative peak detection unit to determine the level of all positive peak values and all negative peak values occurring within each portion of the scan reflectance profile signal, the method comprising the steps of:

(a) producing a first derivative signal of the scan reflectance profile signal as the scan reflectance profile signal is generated;
(b) producing a second derivative signal as the first derivative signal is produced;
(c) detecting a zero crossing in the first derivative signal;
(d) determining one of:
 (i) when the level of the first derivative signal has risen above a predefined first threshold level and performing a reset operation on the positive peak detection unit, and
 (ii) when the level of the first derivative signal has dropped below a predefined second threshold level and performing a reset operation on the negative peak detection unit;
(e) detecting a zero crossing of the second derivative signal and doing one of:
 (i) producing a sample value indicating the level of a negative peak captured by the negative peak detection unit at the occurrence of a rise above the first threshold level in step (d)(i), and
 (ii) producing a sample value indicating the level of a positive peak captured by the positive peak detection unit at the occurrence the drop below the second threshold level in step (d)(ii);
(f) storing the sample value produced in step e; and
(g) repeating steps c, d, e, and f until all portions of the scan reflectance profile signal are analyzed, and all positive and negative peaks occurring therein have been determined and stored as peak sample values.

28. The method according to claim 27, including the additional steps required to post process the sample values stored to evaluate the quality of an indicia which was scanned to generate the scan reflectance profile signal analyzed and sampled, the additional steps comprising:
(a) selecting the highest positive peak sample value and the lowest negative peak sample value, and determining an average value thereof to be utilized as a global threshold;
(b) processing the peak sample values stored in the sequence in which the sample values were collected, the processing to determine each incidence of either of:
 (i) a first sample value that is above the global threshold, which is immediately followed by a second sample value that is below the global threshold, and
 (ii) a first sample value that is below the global threshold, which is immediately followed by a second sample value that is above the global threshold; and (c) using each incidence of step (b), which is assumed to indicate the occurrence of a edge within the scan reflectance profile signal, to group and associate at least one peak sample value collected with each respective element of the scanned bar code indicia.

29. The method according to claim 27, further including the step of post processing each group of sample values to determine and store each of the highest positive peak sample value and lowest negative peak sample value occurring within each group of sample values.

30. The method according to claim 29, further including the step of a post processing the highest and lowest peak values stored to determine at least one figure of merit associated with the quality of the scanned bar code indicia.

* * * * *